US011873445B2

(12) United States Patent
Urynowicz (10) Patent No.: US 11,873,445 B2
(45) Date of Patent: Jan. 16, 2024

(54) METHODS FOR MICROBIAL GAS PRODUCTION AND USE AS ISOTOPIC TRACER

(71) Applicant: UNIVERSITY OF WYOMING, Laramie, WY (US)

(72) Inventor: Michael Urynowicz, Fort Collins, CO (US)

(73) Assignee: UNIVERSITY OF WYOMING, Laramie, WY (US)

( * ) Notice: Subject to any disclaimer, the term of this patent is extended or adjusted under 35 U.S.C. 154(b) by 0 days.

(21) Appl. No.: 17/695,521

(22) Filed: Mar. 15, 2022

(65) Prior Publication Data

US 2022/0290036 A1   Sep. 15, 2022

Related U.S. Application Data

(60) Provisional application No. 63/161,336, filed on Mar. 15, 2021.

(51) Int. Cl.
*E21B 47/11* (2012.01)
*C09K 8/582* (2006.01)
(Continued)

(52) U.S. Cl.
CPC .......... *C09K 8/582* (2013.01); *E21B 41/0064* (2013.01); *E21B 43/295* (2013.01); *E21B 47/11* (2020.05); *G01V 9/007* (2013.01)

(58) Field of Classification Search
CPC ......... C09K 8/58; C09K 8/582; E21B 41/005; E21B 41/0057; E21B 41/0064;
(Continued)

(56) References Cited

U.S. PATENT DOCUMENTS 3,769,164 A * 10/1973 Azarowicz .............. C02F 1/681
435/942
4,759,772 A    7/1988 Rogers et al.
(Continued)

FOREIGN PATENT DOCUMENTS

CA        2691094 A1    12/2008
CN      102383771 A     3/2012
(Continued)

OTHER PUBLICATIONS

Translation of DE-4127744-A1 (Year: 1993).*
(Continued)

*Primary Examiner* — Angela M DiTrani Leff
(74) *Attorney, Agent, or Firm* — Patterson + Sheridan, LLP (57) ABSTRACT

Methods of natural gas production and carbon sequestration are provided. The method includes delivering a feedstock downhole to a coal reservoir, generating biogas within the coal reservoir, and harvesting the biogas. Another method for tracing the migration of biogas in a coal reservoir includes delivering a feedstock downhole to a coal reservoir, generating biogas that is isotopically differentiable from a background gas within the coal reservoir through microbial action, harvesting the biogas, analyzing the biogas from the coal reservoir at the injection well and at one or more offset wells within the same coal reservoir, detecting the biogas at the offset wells using isotopic differentiation, and mapping the migration of the biogas from the injection well to the offset wells using the biogas as an isotopic tracer.

20 Claims, 8 Drawing Sheets

(51) Int. Cl.
*G01V 9/00* (2006.01)
*E21B 41/00* (2006.01)
*E21B 43/295* (2006.01)

(58) Field of Classification Search
CPC ...... E21B 43/006; E21B 43/295; E21B 47/10; E21B 47/11; G01V 9/007
See application file for complete search history.

(56) References Cited

U.S. PATENT DOCUMENTS

| | | | |
|---|---|---|---|
| 4,826,769 | A | 5/1989 | Menger |
| 4,882,274 | A | 11/1989 | Pyne, Jr. et al. |
| 5,501,273 | A | 3/1996 | Puri |
| 6,143,534 | A | 11/2000 | Menger et al. |
| 6,543,535 | B2* | 4/2003 | Converse ............... C12P 5/023 166/403 |
| 7,556,094 | B1 | 7/2009 | Urynowicz et al. |
| 7,640,978 | B2 | 1/2010 | Pfeiffer et al. |
| 7,704,746 | B1 | 4/2010 | White et al. |
| 7,832,475 | B2* | 11/2010 | Jin .......................... B09B 3/00 166/371 |
| 8,176,978 | B2* | 5/2012 | Downey ................ C09K 8/582 166/275 |
| 10,151,185 | B2 | 12/2018 | Urynowicz et al. |
| 10,703,981 | B2 | 7/2020 | Urynowicz et al. |
| 2001/0045279 | A1 | 11/2001 | Converse et al. |
| 2004/0033557 | A1* | 2/2004 | Scott ....................... C09K 8/62 435/132 |
| 2007/0248531 | A1 | 10/2007 | Debryun et al. |
| 2007/0251146 | A1 | 11/2007 | Larter et al. |
| 2009/0246849 | A1 | 10/2009 | Jin et al. |
| 2010/0047793 | A1 | 2/2010 | Toledo et al. |
| 2010/0081184 | A1 | 4/2010 | Downey et al. |
| 2010/0093046 | A1* | 4/2010 | Remmereit ............ C12M 21/02 435/162 |
| 2010/0101782 | A1 | 4/2010 | Pfeiffer et al. |
| 2011/0027849 | A1 | 2/2011 | Jin et al. |
| 2011/0308790 | A1 | 12/2011 | Strapoc et al. |
| 2013/0092370 | A1 | 4/2013 | Urynowicz et al. |
| 2014/0300895 | A1 | 10/2014 | Pope et al. |
| 2018/0001256 | A1 | 1/2018 | Jin et al. |
| 2018/0066504 | A1* | 3/2018 | Lawson ................. E21B 43/25 |

FOREIGN PATENT DOCUMENTS

| | | | | |
|---|---|---|---|---|
| DE | 4127744 | A1 * | 2/1993 | ............ C09K 8/605 |
| WO | WO-2008042888 | A2 * | 4/2008 | ............ C09K 8/582 |

OTHER PUBLICATIONS

International Search Report and Written Opinion for International Application No. PCT/US22/20377 dated Jun. 15, 2022.

White, "Bioconversion of brewer's spent grains to bioethanol" FEMS Yeast Res 8 (2008) 1175-1184. Vares, et al., Lignin Peroxidases, Manganese Peroxidases, and Other Ligninolytic Enzymes Produced by Phlebia radiata during Solid-State Fermentation of Wheat Straw, 1995, Applied and Environmental Microbiology, vol. 61, No. 10, pp. 3515-3520.

Vares, et al., Lignin Peroxidases, Manganese Peroxidases, and Other Ligninolytic Enzymes Produced by Phlebia radiata during Solid-State Fermentation of Wheat Straw, 1995, Applied and Environmental Microbiology, vol. 61, No. 10, pp. 3515-3520.

PCT/US2012/31885, International Search Report and Written Opinion dated Jun. 27, 2012, 8 pages.

* cited by examiner

METHODS FOR MICROBIAL GAS PRODUCTION AND USE AS ISOTOPIC TRACER

CROSS-REFERENCE TO RELATED APPLICATIONS

This application claims benefit of U.S. Provisional patent application No. 63/161,336, filed Mar. 15, 2021, which is incorporated herein by reference in its entirety.

BACKGROUND

Field

Embodiments of the present disclosure generally relate to methods of microbial gas production and use as an isotopic tracer.

Description of the Related Art

The future of enhanced oil recovery (EOR) will likely depend, at least in part, on the development of cost-effective carbon off-set strategies for managing carbon in the fossil fuels produced. $CO_2$ storage and oil recovery in the greenfield ("fairway") residual oil zones (ROZ) are contemplated as being a potential solution for EOR that off-sets carbon in a meaningful manner. Candidate formations for geologic $CO_2$ storage include deep saline formations, depleted oil and natural gas reservoirs, saline-filled basalt formations, and deep unmineable coal seams.

When considering carbon capture and sequestration (CCS), unmineable coal seams have an added advantage in that $CO_2$ molecules can be physically attached to the coal through adsorption. Since coal zones are generally shallower than other oil and gas formations, the coal zones can also serve as secondary containment reservoirs for deeper reservoirs, like the ROZ, to prevent or substantially mitigate carbon dioxide leakage. However, such EOR and CCS strategies for implementation in coal seams are not well developed.

Accordingly, what is needed in the art are improved methods for monitoring the fate and transport of gases within these reservoirs.

SUMMARY

In one embodiment, a method of generating biogas is disclosed. The method comprises delivering a feedstock downhole to a coal reservoir, generating biogas within the coal reservoir, and harvesting the biogas.

In another embodiment, a method for tracing the migration of biogas in a coal reservoir is disclosed. The method comprises delivering a feedstock downhole to a coal reservoir via an injection well, generating a biogas within the coal reservoir through microbial action, creating a biogas that is isotopically differentiable from a background gas that is native to the coal reservoir, harvesting the biogas at the injection well and one or more offset wells of the coal reservoir, analyzing the biogas and coal bed methane from the coal reservoir at the injection well and at one or more offset wells within the same coal reservoir, detecting the biogas at the offset wells using isotopic differentiation, and mapping the migration of the biogas from the injection well to the offset wells using the biogas as an isotopic tracer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure relate to the use of enhanced oil recovery (EOR) via carbon capture and sequestration (CCS) of possible reservoir leakage. In one embodiment, the generation of biomass-enhanced natural gas (i.e., biogas) from coal reservoirs are described herein. In another embodiment, microbially generated biogas isotopic tracer (MGB-IT) technology is utilized to provide a more detailed understanding of the transport mechanisms in EOR reservoirs. Embodiments described herein may be advantageously employed in various coal producing regions.

The method for generating biogas will now be briefly described. The method includes delivering a feedstock downhole to a coal reservoir. In various embodiments of the disclosure, the feedstock comprises one of beet molasses (molasses desugarized soluble or MDS), sugar cane, sugar beet thick juice, sugar beets, alfalfa, corn extract, or other energy crop. Next, the method includes generating biogas in the coal reservoir. By providing the feedstock as an energy source for in-situ microorganisms/microbes within a coal reservoir, enhanced anaerobic digestion by the microorganisms/microbes is enabled. In one embodiment, biogas generated as a result of the anaerobic digestion provides increased downhole pressures to increase coal bed methane (CBM) production. In one embodiment of the disclosure, the microorganisms produce microbially enhanced methane as the biogas in the coal reservoir. In one embodiment, the coal reservoir is a depleted CBM well. In one embodiment, the biogas produced has a lower carbon intensity (CI) index than the background CBM.

The method includes harvesting the biogas and analyzing an isotopic signature of a background gas, i.e., coal bed methane, from the coal reservoir and analyzing an isotopic signature of the biogas from the coal reservoir. Biogases (such as methane and carbon dioxide) produced using embodiments described herein are isotopically differentiable from existing background gases, such as in-situ CBM, as discussed further below. The method further includes analyzing wellbore and formation characteristics using the differentiation between the isotopic signature of the biogas and an isotopic signature of a background gas.

The method also includes sequestering carbon dioxide within the coal reservoir by adsorption to the coal in the coal reservoir. In coal reservoirs, the geologic factors that dictate CBM availability are similar to those that control the sequestration of carbon dioxide. Adsorption can occur by either physical or chemical trapping processes and gas content is typically determined by the hydrostatic pressure and temperature of the reservoir. Although both methane and carbon dioxide compete for available adsorption sites, coal has a greater affinity for carbon dioxide than methane. For example, certain coals can adsorb as much as four times more $CO_2$ than $CH_4$ at 300 psi. Water content also has a significant effect on the adsorption of both gases. Results and analysis from the reservoir characterization described herein provide valuable insight into the feasibility of sequestering $CO_2$ in unmineable coalbeds.

In one embodiment, the method further includes storing the biogas in the coal reservoir. Because methane is capable of adsorption to the coal, the methane produced in the coal reservoir is capable of being stored for a period of time. This enables flexibility in harvesting the methane to account for a rise and fall in energy demand or to enable increased or decreased production to account for economic or market conditions.

The method may also include injecting water into the coal reservoir with the feedstock to aid in the distribution of the feedstock. As such, biogas produced according to the embodiments of the present disclosure may be utilized as a stable isotopic tracer for evaluating the carbon sequestration potential of coal reservoirs and other coal formations. The MGB-IT technology may also be utilized in EOR reservoirs. For example, the flow of biogas through coal cleats is analogous to the hydraulic fractures created for the purpose of increasing oil and/or gas flow from petroleum-bearing rock formations. High velocity water enhancements used to deliver the microbial feedstock act in much the same way (but over a much smaller influenced volume) as the fracturing fluids used to fracture tight sandstone and shale. As such, the results from studies and modeling verification exercises performed according to the embodiments described herein provide for improved understanding of the transport mechanisms responsible for fluid flow in EOR reservoirs.

In one embodiment, the method further includes measuring the isotopic signatures using mass spectroscopy, i.e., an IsoTube® Gas Sampling System.

Figure 1:
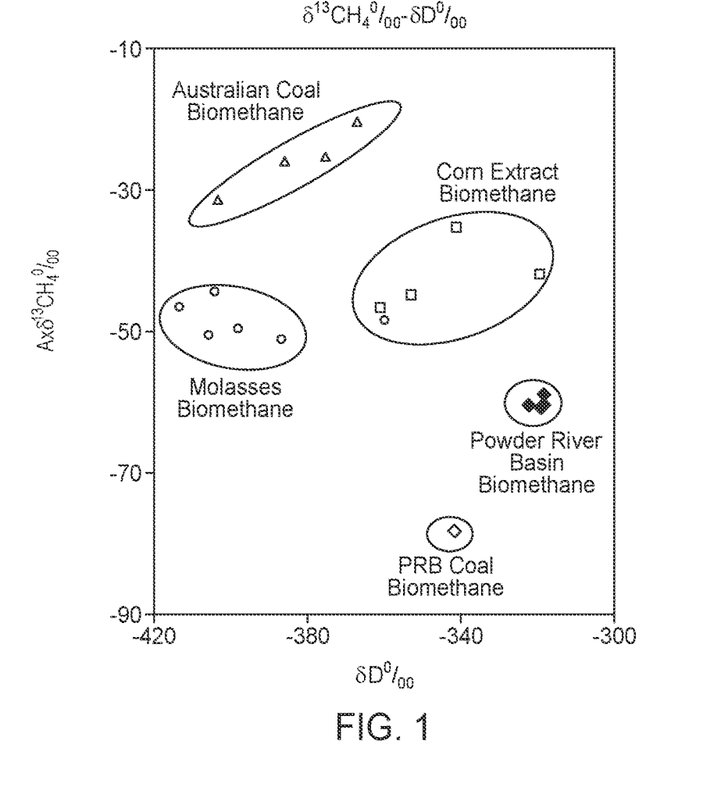
FIG. 1 illustrates isotropic signatures for various natural gases according to an embodiment of the disclosure.

A method for tracing the migration of biogas in a coal reservoir will now be briefly described. The method includes delivering a feedstock downhole to a coal reservoir of an injection well. The feedstock includes, for example, beet molasses (molasses desugarized solubles), sugar cane, sugar beads, alfalfa, corn extract, or other suitable energy crops. The method includes generating a biogas within the coal reservoir using microbial action and creating a biogas that is isotopically differentiable from a background gas that is. In one embodiment, the biogas generated is methane or biomethane. Referring to FIG. 1, the biotracer assay for various natural gases is shown. The background gas, i.e., CBM, is isotopically differentiable from biogases, such as biomethane. The data in FIG. 1 represents isotopic signatures for natural gases, such as Powder River Basin (PRB) CBM and Australian coal biomethane, as well as isotopic signatures of biogas generated by coal bed indigenous microorganisms which had been fed MDS and corn extract.

The method further includes harvesting biogas at the injection well and one or more offset wells of the same coal reservoir and analyzing the biogas and coal bed methane from the coal reservoir at the injection well and at one or more offset wells to the same coal reservoir. The method also includes detecting the biogas at the offset wells using isotopic differentiation and mapping the migration of the biogas from the injection well to the offset wells using the biogas as an isotopic tracer. The method further comprises injecting water into the coal reservoir to aid in the distribution of the feedstock.

The uniquely identifiable biogas enables improved modeling of flow characteristics within the wellbore and surrounding formation. The stable isotopes of C and H may be used to track the fate and transport of $CH_4$ and $CO_2$ in order to further characterize the reservoir based upon the clear delineation in isotopic signature between CBM and microorganism generated biogas. In one embodiment, the biotracer is combined with a selection of partitioning tracers, allowing for a more accurate estimate of residual oil saturation and enabling optimization of chemical applications in reservoirs specifically suited for EOR operations. The results enable improved understanding of the matrix properties of the coal reservoir properties and the complex heterogeneous architecture of cleats and fractures at well sites.

EXPERIMENTAL

Oil and gas production from Cretaceous age reservoirs, such as the Powder River Basin (PRB) in Wyoming, in marine sands, and shale that underlie Tertiary age coals have been successfully utilizing vertical wellbore completion methods. These fields and adjacent areas, which extend throughout the PRB, remain valuable as horizontal drilling and completion technologies have matured. They are also valuable for their carbon sequestration potential. The embodiments and results described herein were obtained from a site within the northern most zone of highest $CO_2$ storage capacity ($4.0$-$5.0 \times 10^6$ st/mi$^2$).

The PRB is a Laramide orogenic structural feature that began forming approximately 100 million years ago with the deposition of marine sediments into the Western Interior Seaway during the late Cretaceous geologic period. The Big George coal seam is generally understood as the most productive individual coal reservoir in the Powder River basin, producing 57.0 billion cubic feet (BCF) in 2020 and coal reservoir combinations that included the Big George produced another 18.2 BCF, for a total of 75.2 BCF produced from the Big George and associated coals. The $CO_2$ sequestration potential of the Powder River Basin's Wyodak-Anderson coal zone has been estimated to be 137.6 trillion cubic feet (TCF).

Various challenges exist for certain EOR technologies, such as fracking, and current modeling technologies often fail to provide sufficient insight into the causes of such challenges. For example, clay swelling on the surface of hydraulic fractures can significantly reduce fracture conductivity and the occurrence of clay swelling is highly dependent on the fracture network. The present disclosure provides for detailed modeling of sorption-induced strain effects in coal and for swelling induced conductivity damage in hydraulic fractures. The disclosure also provides for models of enhanced hydrocarbon recovery and production.

Carbon dioxide injected underground for EOR remains trapped in the geologic formation where the oil is recovered, enabling substantial carbon sequestration. However, the viability of carbon dioxide injection depends directly on the source of the $CO_2$. At the present time, no appreciable amount of the $CO_2$ used in EOR comes from direct air capture. However, EOR adaptations regarding the type of $CO_2$ (anthropogenic versus natural) may offer lower lifecycle emissions of the oil and gas produced, enabling EORs direct link to CCS. A further benefit of the present disclosure is modeling the capability of coals overlying the EOR zones to capture and sequester $CO_2$ that might leak from the EOR reservoir due to natural or other fractures. This benefit also applies to unconventional reservoirs now being tapped by horizontal well drilling that underlie coal reservoirs which may eventually be targets for EOR.

The test site was located on the Innes Ranch between Gillette, Wyoming and Wright, Wyoming. The wells used for the field experiments are part of a well cluster. The field experiments were performed with two injection wells and a plurality offset wells. An intercept well was drilled and cored approximately 100 feet northwest of the first well in order to provide coal samples for testing and geophysical logs of the coal reservoir and overlying seal rocks. At a first injection well, 13,000 gallons of beet molasses, such as molasses desugarized solubles (MDS), were injected into the coal reservoir. At a second injection well, 6500 gallons of MDS were injected into the coal reservoir. At the time of injection, both wells were under high hydrostatic pressure.

The MDS utilized contained about 16% sugar and about 20% ash (a measure of the inorganic material in a food product). The MDS also contained other elemental cations that can be associated with the total dissolved solids (TDS) in the water within the coal reservoir. A water recirculation system was used to recover produced water from the recovery wells and inject the produced water into the first and second injection wells to further aid in distributing the MDS feedstock throughout the coal reservoir. Water samples were collected from each injection well and monitored to analyze for dissolved solids. The water recirculation system was in continuous operation except during periods of injection.

Gas samples were obtained on a daily basis in conjunction with the periodic groundwater sampling. Prior to the start of the field demonstration, geophysical logs were generated. A coal desorption test was performed on-site during well construction in order to determine background CBM levels at the site. Coal samples (including intact core) obtained during the construction of the intercept well are placed into rigid PVC containers and subsequently filled with formation water for transport. The PVC containers were stored in a cold room at a temperature of 3° C. (37° F.) for subsequent laboratory analysis. Such analysis include adsorption/desorption tests and flow experiments. The apparatus used for the laboratory analysis included a retrofit coreholder.

Geophysical borehole logs are obtained from the intercept well in order to measure in situ reservoir characteristics, including but not limited to, formation resistivity, density, gamma radioactivity, sonic velocities, and images of cleats and fractures that intercept the wellbore. The gamma, density, and resistivity data were used to estimate coal reservoir and other hydrostratigraphic unit thicknesses. The sonic and density data were used to calculate in-situ values of rock compressibility and Poisson's ratio, which validate reservoir model assumptions. Reservoir pressure and potentiometric head data collected during the injection and pressure recovery processes were used to calculate anisotropic hydraulic and reservoir characteristics of the coal reservoir.

Results from the adsorption/desorption and flow experiments are used to better understand the fundamental mechanisms of methane and carbon dioxide transport in coal seams of the coal reservoir, including sorption-induced strain effects, commonly referred to as coal swelling/shrinkage, which can limit the transport of these gases by reducing the matrix porosity and gas permeability of coal. Further characterization of the reservoir and fluid properties is performed using scanning electron microscopy (SEM). The coal cores were imaged prior to and following the flow experiments and the results were further analyzed using a four wall 3D cave automatic virtual environment to model data obtained from the experiments.

Groundwater and gas samples were collected from the injection wells and offset wells every two weeks for six months. The groundwater samples were analyzed for dissolved metals, alkalinity, major anions and cations, bacteria, dissolved gases, conductivity, nitrate ($NO_3$-) and nitrite ($NO_2$-), total phosphorus (TP), total dissolved solids (TDS) and volatile organic compounds (VOCs). Gas samples were analyzed for nitrogen ($N_2$), methane ($CH_4$), $CO_2$, ethane ($C_2H_6$), and hydrogen sulfide ($H_2S$). An isotopic assay for the stable isotopes of carbon ($\delta^{13}C$—$CO_2$%, $\delta^{13}C$—$CH_4$%) and deuterium ($\delta$ D %) was performed as well.

Figure 2:
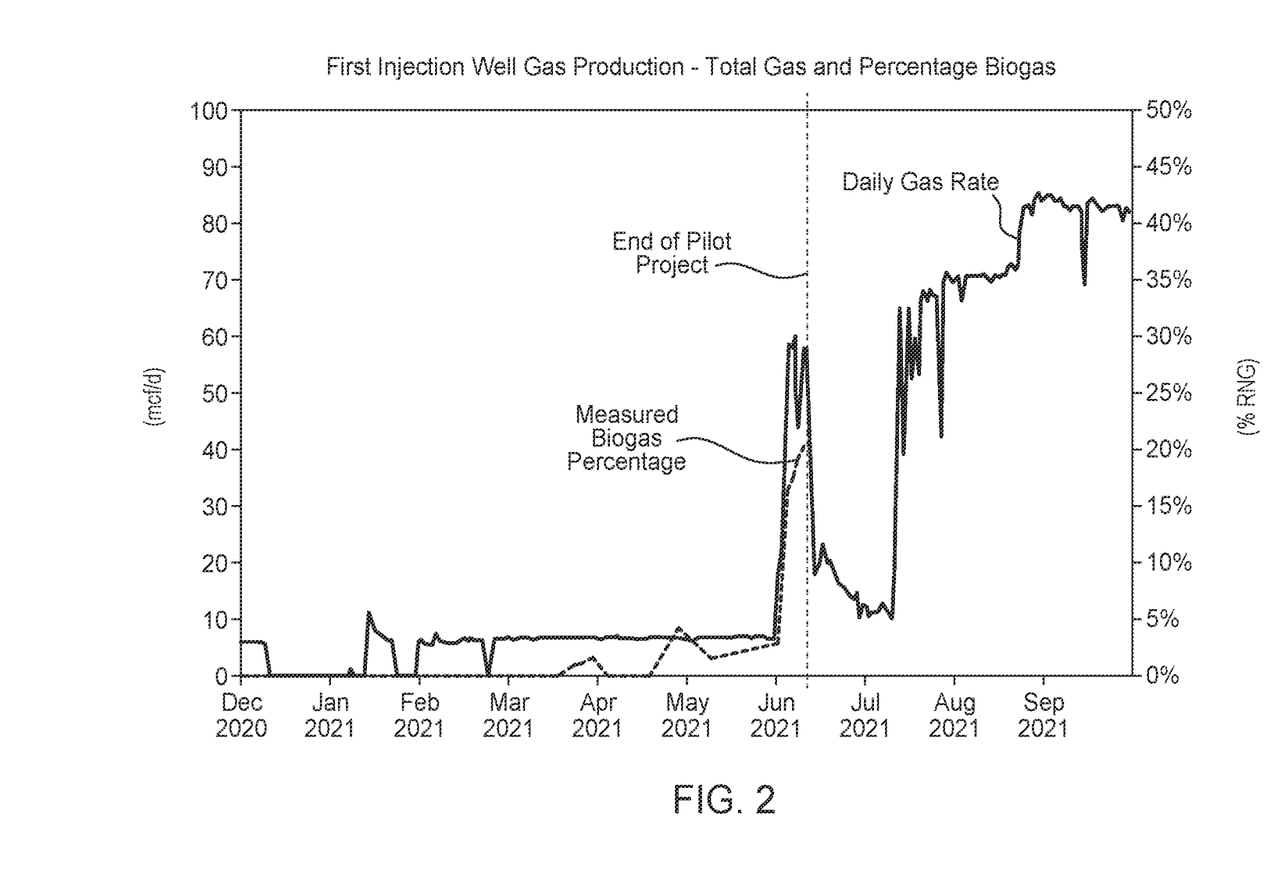
FIG. 2 illustrates a graph of the total gas produced and percentage biogas at a first injection well according to an embodiment of the disclosure.

Referring to FIG. 2, a graph of the total gas produced at the first injection well and the percentage of biogas within the total gas produced is shown. There was a significant shift in the stable isotopic signatures for both the first and second injection wells as compared to the background data. Although the $\delta$ D % shift was more pronounced, a significant shift also occurred with respect to the $\delta^{13}C$—$CH_4$%, demonstrating that low carbon biogas can be differentiated from CBM using stable isotope technology. At the 135 day mark, biogas was detected in the gas stream produced by the first injection well. The biogas produced was a renewable natural gas (RNG) such as methane. The first injection well did not produce significant gas until the beginning of June when the water pump in the first injection well was turned on to reduce the backpressure on the wellbore. This had been previously constraining gas production, as CBM wells typically require pressure drawdown at the producing well to recover significant volumes of gas. Once the pressure drawdown began, the total gas rates rose. The maximum biogas concentration peak occurred after the early sampling campaign ended, based on data trends at the six month mark.

Figure 3:
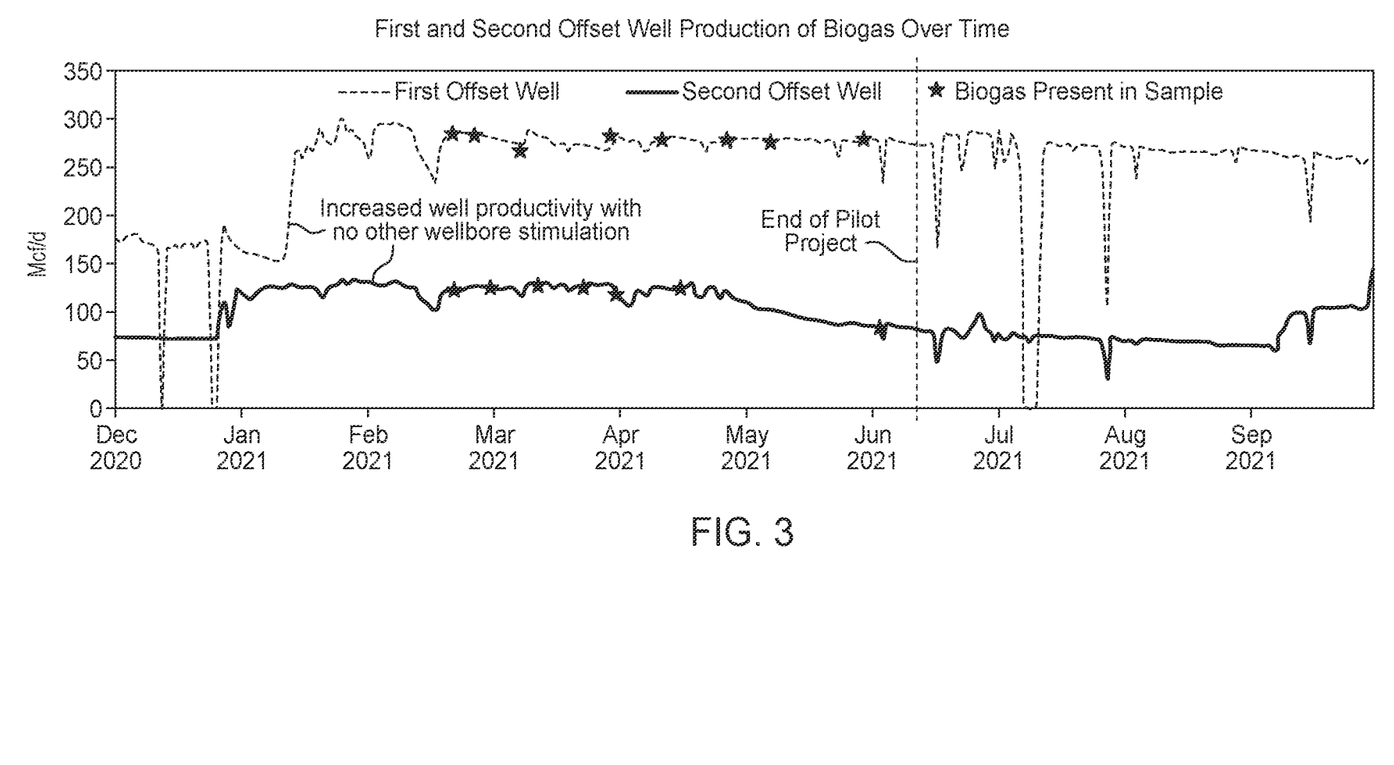
FIG. 3 illustrates a graph of the first and second offset well biogas production over time according to an embodiment of the disclosure.

Referring to FIG. 3, the gas production of a first and second offset well are shown. The first and second offset wells were actively producing gas and were monitored during the field demonstration. Throughout the six month project timeframe, the first and second offset wells were pumping water and had much lower downhole hydrostatic pressure than the first injection well. The low pressure and short distances (approximately a quarter mile) between the first injection well and the first and second offset wells recruited the biogas produced at or near the injection well. Samples taken at day 67 detected biogas in the first and second offset wells, as opposed to day 135 in the first and second injection wells, and fifteen samples taken between day 67 and 171 contained measurable quantities of biogas in the first and second offset wells. The detection of biogas in both offset wells demonstrates the significant transport capacity and subsurface connectivity of the coal reservoir.

Figure 4:
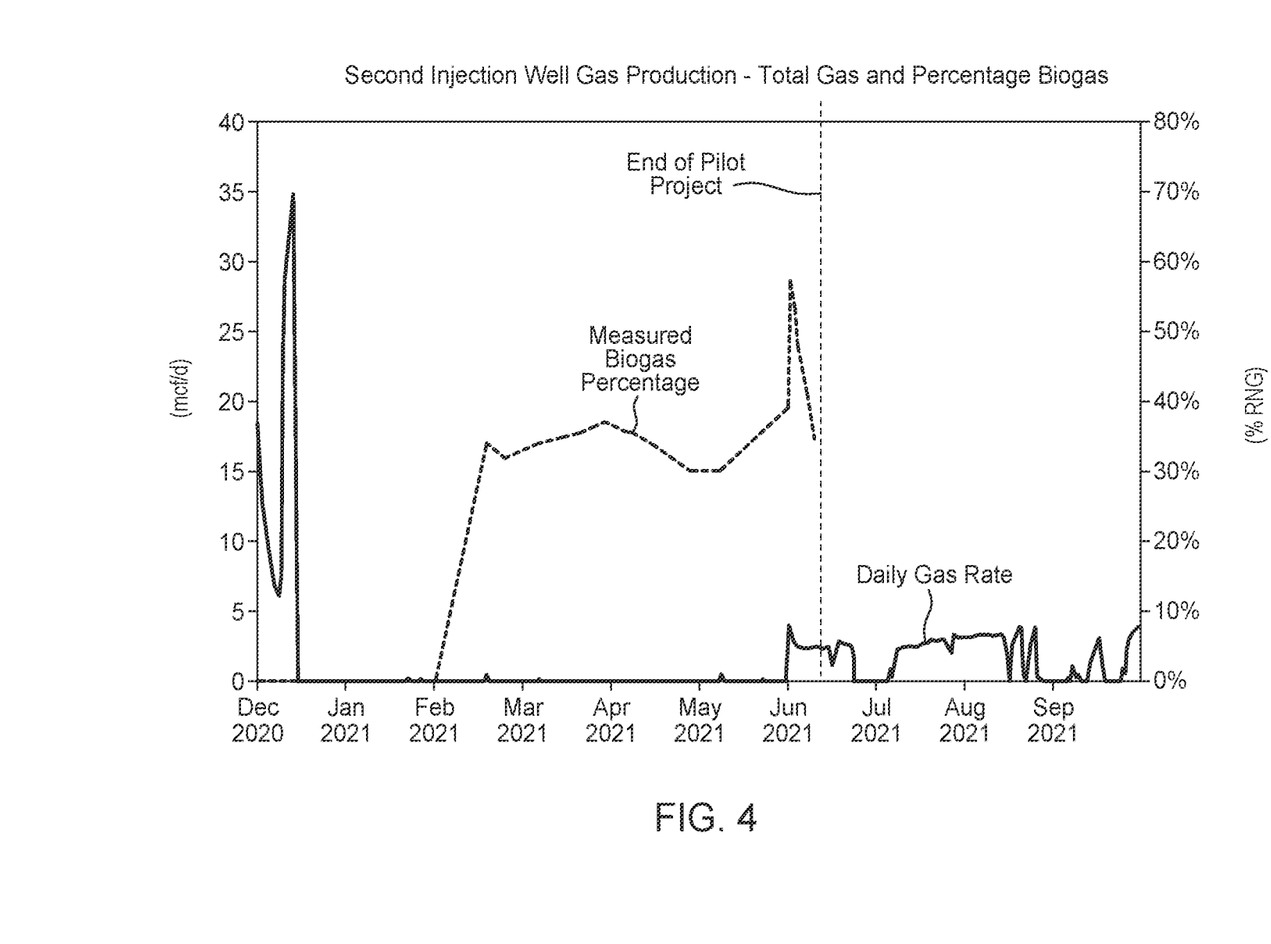
FIG. 4 illustrates a graph of the total gas and percentage biogas produced at a second injection well according to an embodiment of the disclosure.

Referring to FIG. 4, the total gas production at the second injection well and the measured biogas percentage of the total gas production is shown. The backpressure on the second injection well was too high to allow for significant gas production, but limited gas volumes were produced through the six month project time period. Biogas was detected within 60 days of the injection and remained stable for over four months. A significant percentage of the gas produced (~30-40%) during the project timeframe was biogas, indicating high volumes of biogas can be produced in commercial operations. The percentage rates of the biogas in the second injection well exceeded the percentage rates of biogas in the first injection well, even though half the volume of feedstock was injected into the second injection well. This indicates that higher feedstock may not lead to high biogas percentages in produced gas.

Figure 5:
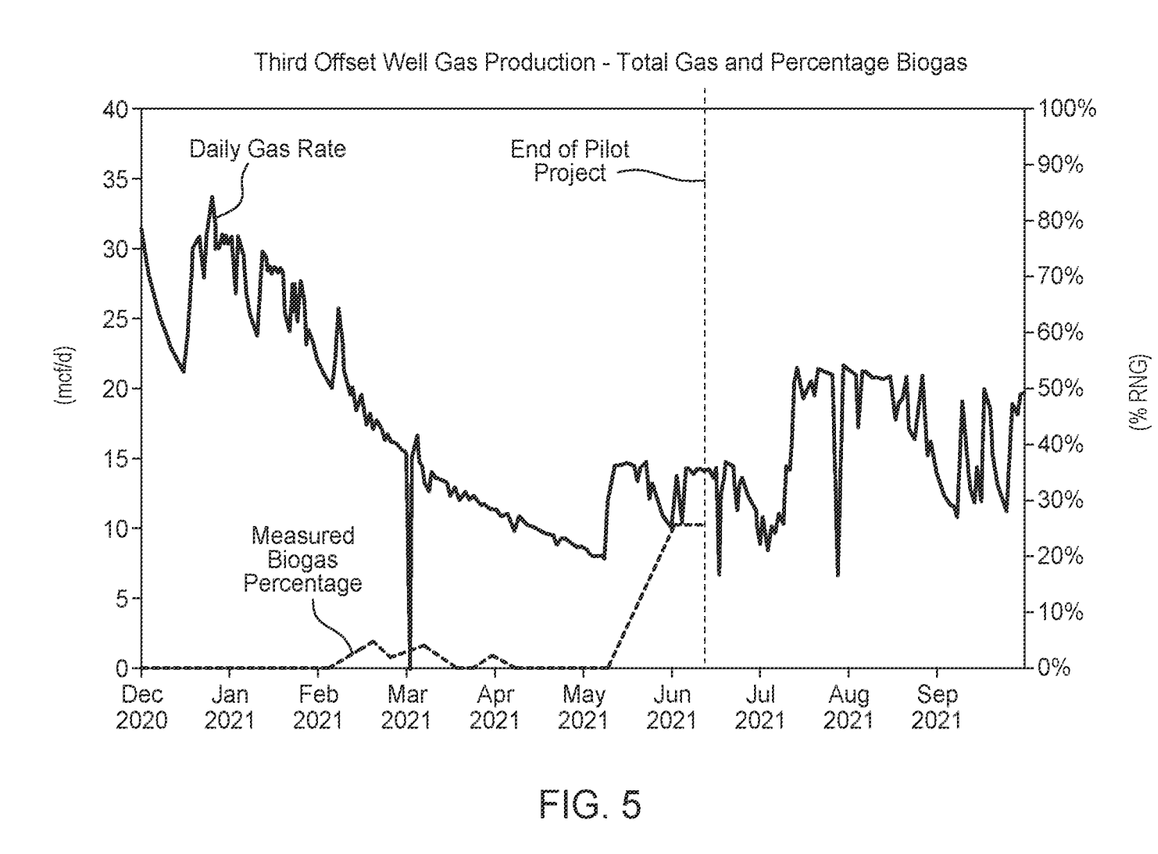
FIG. 5 illustrates a graph of the total gas and percentage biogas of a third offset well according to an embodiment of the disclosure.

Referring to FIG. 5, the total gas production of a third offset well and the measured biogas percentage of the total gas production is shown. Similar to the first and second offset wells, the third offset well produced significant gas during the project timeframe, despite being a half mile away from the second injection well. The gas samples contained significant (>25% concentration) biogas production, and further demonstrates the subsurface connectivity of the coal reservoir. Commercially, the third offset well showed significant results in the use of a wider coal reservoir for the production of biogas.

Figure 6A:
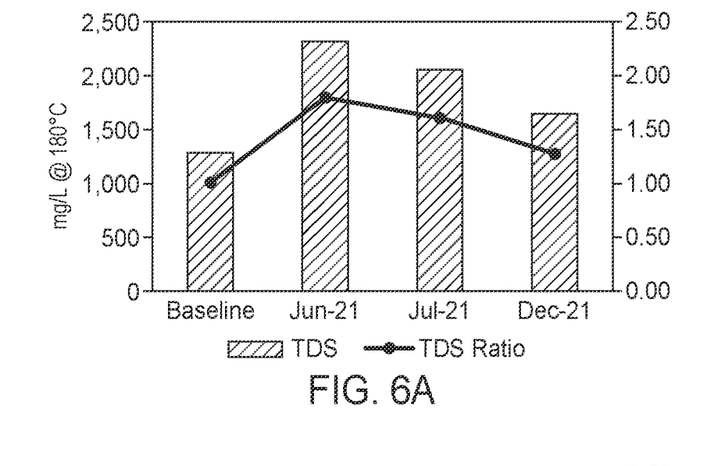
FIG. 6A-6D illustrate graphs of the analysis of water in the coal reservoir according to an embodiment of the disclosure.
Figure 6B:
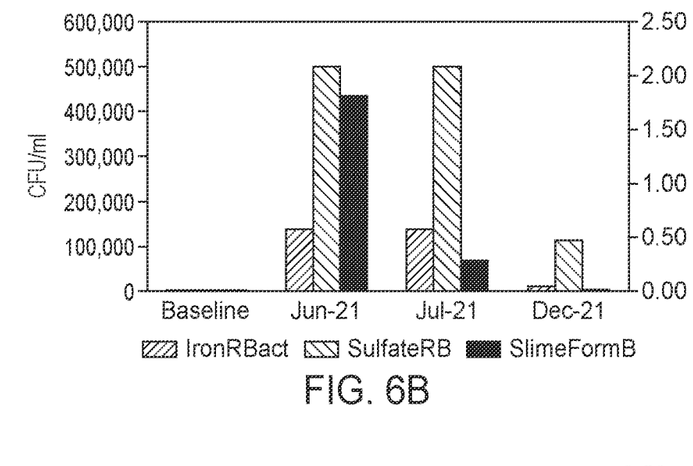
Figure 6C:
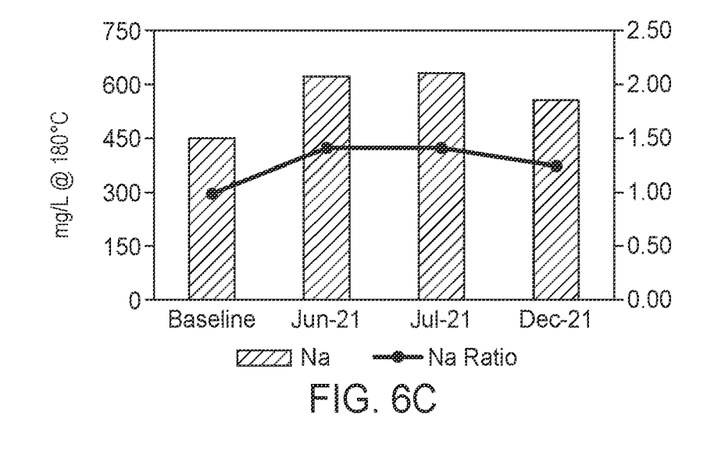
Figure 6D:
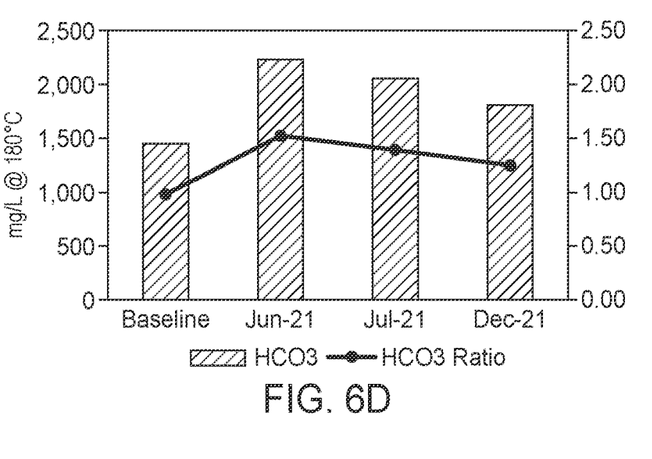

Referring to FIGS. 6A-D, the results from the water sampling analysis is shown. In FIG. 6A, the TDS concentration was measured throughout the project time frame. As a result of the injection, the TDS levels were elevated early in the project time frame. However, overtime the TDS levels continued to decrease toward the baseline levels. In the first injection well, which had the largest volume of feedstock pumped into it, the baseline TDS measured before injection was 1,290 mg/L. The first injection well did not have an active water pump until six months into the project time frame. At the time the water pump was activated, a water sample showed that the "near wellbore" produced water TDS levels had increased to 2,320 mg/L (~1.8× the baseline TDS level). When a sample was taken a month later, the TDS level had fallen to 2,070 mg/L. The last sample, taken a year after injection and following 3,300 bbls of water production, revealed that TDS levels in the produced water had dropped down to 1,650 mg/L (1.28× baseline TDS levels), and are within 30% of the baseline level. Referring to FIG. 6B, the bacteria levels were also studied. All the bacteria levels quickly fell to pre-injection levels (as measured in colony-forming-units per mL). Referring to FIGS. 6C and 6D, the sodium and bicarbonate levels in the water samples are shown. These, too, are both declining with the falling TDS levels.

Figure 7:
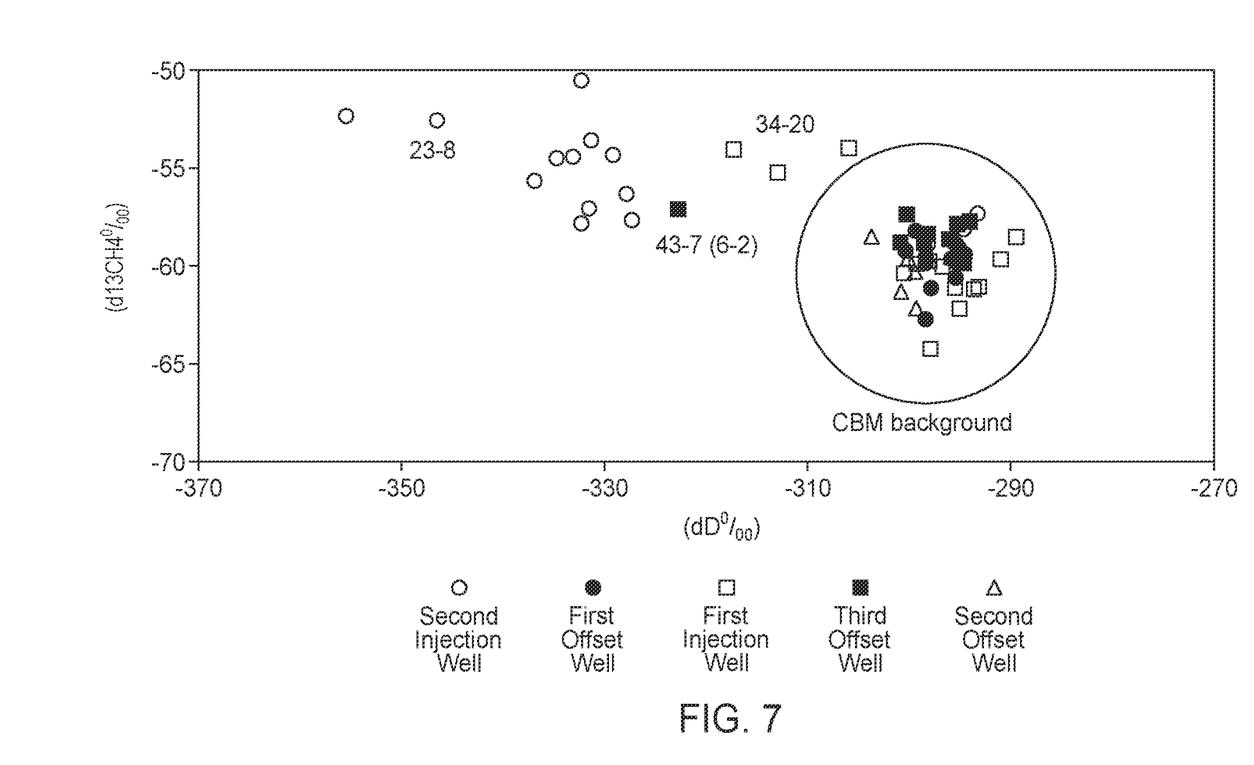
FIG. 7 illustrates a graph of isotopic signatures in the injection wells and offset wells according to an embodiment of the disclosure.
Figure 8:
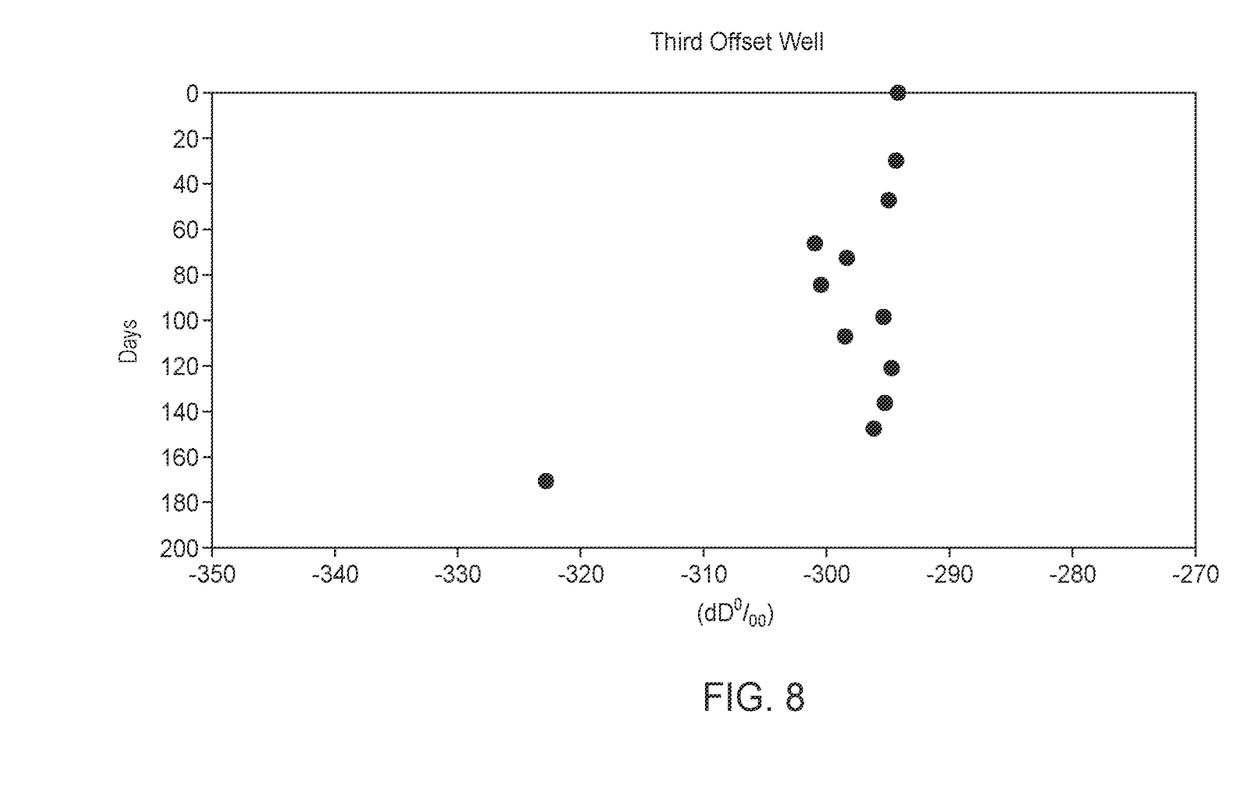
FIG. 8 illustrates a graph of deuterium over time in the third offset well according to an embodiment of the disclosure.

Referring to FIG. 7, the isotopic testing results are shown. The chart is set up such that the X-axis shows the normalized mole fraction of deuterium and the Y-axis shows the normalized fraction of the carbon 13 isotope. As a greater percentage of gas is produced from the biogas, the gas signature will move up and to the left. The plot shows that there was a significant shift in the stable isotope signatures for both the first and second injection wells over time from the background CBM signatures to the biogas signatures (in the direction of the arrow). The finding confirmed results that microbial activity is stimulated by the injection of feedstock into a coal reservoir, as indicated by the production of biogas. The inoculation period was surprisingly short, as biogas was observed as early as 70 days after injection. Significant volumes (30-40%) of biogas were measured in the first and second injection wells once the first and second injection wells were returned to full production. In addition, $CO_2$ concentration in the produced gas was consistent with $CO_2$ concentration in the historical fossil CBM production (nominal 3-5%), indicating that the carbon dioxide produced by the microbial activity had been completely or substantially completely sequestered within the coal reservoir. Significant volumes of biogas were also measured in the first, second, and third offset wells that were under lower hydrostatic pressure, including the third offset well that was a half mile from the second injection well, as seen in the deuterium shift that takes place at day 175 in FIG. 8. This indicates significant connectivity within the coal reservoir for feedstock and biogas transport and a strong potential to operate commercially using multiple wells in a system to facilitate continuous production of biogas. Sampling using mass spectroscopy (i.e., IsoTube®) and stable isotope analysis further proved to be an effective method for identifying and measuring biogas in gas streams.

In summation, improved methods for gas production and carbon sequestration are provided herein. Isotopically differentiable biogases generated by supplying feedstocks to microorganisms present within coal reservoirs. Utilization of such feedstocks enable production of metabolic byproducts that are isotopically differentiable from CBM and can be utilized as a tracer within the formation of interest.

While the foregoing is directed to embodiments of the present disclosure, other and further embodiments of the disclosure may be devised without departing from the basic scope thereof.

What is claimed is:

1. A method for sequestering $CO_2$ in a coal reservoir, the method comprising:
   delivering a feedstock downhole to a coal reservoir via an injection well;
   generating a biogas through microbial action, wherein the biogas comprises an isotopically differentiable methane and an isotopically differentiable $CO_2$, within the coal reservoir that is isotopically differentiable from a background gas, wherein the background gas comprises a background methane and background $CO_2$ that is native to the coal reservoir;
   harvesting the isotopically differentiable methane and $CO_2$ and background methane and $CO_2$ at the injection well and one or more offset wells of the coal reservoir, wherein the isotopically differentiable $CO_2$ and background $CO_2$ concentration is less than 5% of the biogas and background gas;
   analyzing the isotopically differentiable methane and $CO_2$ and background methane and $CO_2$ from the coal reservoir at the injection well and at one or more offset wells within the same coal reservoir;
   detecting the isotopically differentiable methane and $CO_2$ and background methane and $CO_2$ at the offset wells; and
   mapping migration of the isotopically differentiable methane and $CO_2$ from the injection well through the coal reservoir to the offset wells using the isotopically differentiable methane and $CO_2$ as an isotopic tracer.

2. The method of claim 1, further comprising:
   injecting water into the coal reservoir to aid in the distribution of the feedstock.

3. The method of claim 1, where in the feedstock is comprised of one of beet molasses, sugar cane, sugar beet thick juice, sugar beets, alfalfa, corn extract, other energy crop or food source, or molasses desugarized solubles, and wherein the biogas generated is biomethane.

4. The method of claim 1, wherein the isotopically differentiable methane has a lower carbon intensity than the background methane.

5. The method of claim 1, wherein the isotopically differentiable methane and $CO_2$ have a first isotopic tracer and the background methane and $CO_2$ have a second isotopic tracer, the first isotopic tracer being different from the second isotopic tracer.

6. The method of claim 1, further comprising:
measuring an amount of a first isotopic tracer of the isotopically differentiable methane and $CO_2$ and a second isotopic tracer of the background methane and $CO_2$ at the injection well and the offset wells to determine the amount of isotopically differentiable methane and $CO_2$ and background methane and $CO_2$ produced in the coal reservoir.

7. The method of claim 1, further comprising:
sequestering the isotopically differentiable $CO_2$ and the background $CO_2$ within the coal reservoir.

8. The method of claim 7, wherein the isotopically differentiable $CO_2$ and the background $CO_2$ are sequestered by adsorption to coal in the coal reservoir.

9. The method of claim 8, further comprising:
injecting the feedstock in order to sequester the isotopically differentiable $CO_2$ within the coal reservoir and produce isotopically differentiable methane.

10. The method of claim 9, further comprising:
injecting water into the coal reservoir to distribute the feedstock within the coal reservoir.

11. The method of claim 1, further comprising:
storing the isotopically differentiable methane and background methane.

12. The method of claim 1, wherein the microbial action generating the biogas is an anaerobic digestion.

13. The method of claim 1, further comprising:
combining the isotopic tracer with a partitioning tracer.

14. The method of claim 13, further comprising:
estimating a residual oil saturation of the coal reservoir using the partitioning tracer.

15. The method of claim 1, wherein the isotopically differentiable methane and isotopically differentiable $CO_2$ are isotopically differentiable from the background methane and background $CO_2$ using an isotopic assay for stable isotopes of carbon.

16. The method of claim 1, wherein the isotopically differentiable methane and isotopically differentiable $CO_2$ are isotopically differentiable from the background methane and background $CO_2$ using an isotopic assay for stable isotopes of deuterium.

17. The method of claim 1, further comprising:
delivering a second feedstock downhole to the coal reservoir via the injection well;
generating a second biogas through microbial action, wherein the second biogas comprises a second isotopically differentiable methane and a second isotopically differentiable $CO_2$, within the coal reservoir that is isotopically differentiable from the background gas and the biogas;
harvesting the second biogas at the injection well and one or more offset wells of the coal reservoir;
analyzing the second biogas from the coal reservoir at the injection well and at one or more offset wells within the same coal reservoir;
detecting the second biogas at the offset wells; and
mapping migration of the second biogas from the injection well through the coal reservoir of the offset wells using the second biogas as a second isotopic tracer.

18. The method of claim 17, wherein the microbial action generating the second biogas is anaerobic digestion.

19. The method of claim 17, wherein the second feedstock is different from the feedstock.

20. The method of claim 17, wherein the second isotopic tracer is different from the isotopic tracer.

* * * * *